(12) United States Patent
Hall et al.

(10) Patent No.: US 10,802,990 B2
(45) Date of Patent: Oct. 13, 2020

(54) HARDWARE BASED MANDATORY ACCESS CONTROL

(75) Inventors: William E. Hall, Clinton, CT (US);
Guerney D. H. Hunt, Yorktown Heights, NY (US); Paul A. Karger, Chappaqua, NY (US); Mark F. Mergen, Mount Kisco, NY (US); David R. Safford, Brewster, NY (US); David C. Toll, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 2618 days.

(21) Appl. No.: 12/245,964

(22) Filed: Oct. 6, 2008

(65) Prior Publication Data

US 2010/0088739 A1 Apr. 8, 2010

(51) Int. Cl.
*G06F 12/14* (2006.01)
*G06F 21/71* (2013.01)
*G06F 21/62* (2013.01)

(52) U.S. Cl.
CPC ........ *G06F 12/1483* (2013.01); *G06F 21/629* (2013.01); *G06F 21/71* (2013.01)

(58) Field of Classification Search
None
See application file for complete search history.

(56) References Cited

U.S. PATENT DOCUMENTS 4,455,602 A * 6/1984 Baxter et al. ............... 710/5
4,456,954 A * 6/1984 Bullions et al. .......... 711/207
5,210,874 A * 5/1993 Karger ..................... 719/328
5,226,164 A * 7/1993 Nadas et al. ............. 712/209
5,481,693 A * 1/1996 Blomgren et al. ........ 712/225

(Continued)

FOREIGN PATENT DOCUMENTS

JP 2002215459 A 8/2002
JP 2004529408 A 9/2004

(Continued)

OTHER PUBLICATIONS

Anderson, M. et al., "A Password-Capability System", The Computer Journal, vol. 29, No. 1, Feb. 1986, pp. 1-8.

(Continued)

*Primary Examiner* — Dante Ravetti
(74) *Attorney, Agent, or Firm* — Stephen J. Walder, Jr.; Kurt P. Goudy

(57) ABSTRACT

Hardware mechanisms are provided for performing hardware based access control of instructions to data. These hardware mechanisms associate an instruction access policy label with an instruction to be processed by a processor and associate an operand access policy label with data to be processed by the processor. The instruction access policy label is passed along with the instruction through one or more hardware functional units of the processor. The operand access policy label is passed along with the data through the one or more hardware functional units of the processor. One or more hardware implemented policy engines associated with the one or more hardware functional units of the processor are utilized to control access by the instruction to the data based on the instruction access policy label and the operand access policy label.

22 Claims, 5 Drawing Sheets

(56) References Cited

U.S. PATENT DOCUMENTS

| | | | | |
|---|---|---|---|---|
| 5,613,136 | A * | 3/1997 | Casavant et al. | 712/28 |
| 5,696,959 | A * | 12/1997 | Guttag et al. | 712/245 |
| 5,805,918 | A * | 9/1998 | Blomgren et al. | 712/43 |
| 5,812,868 | A * | 9/1998 | Moyer et al. | 712/23 |
| 5,937,193 | A * | 8/1999 | Evoy | 717/140 |
| 5,958,045 | A * | 9/1999 | Pickett | G06F 9/30043 711/118 |
| 5,970,242 | A * | 10/1999 | O'Connor et al. | 717/100 |
| 5,974,529 | A * | 10/1999 | Zumkehr et al. | 712/41 |
| 5,978,193 | A * | 11/1999 | Kaaden | 361/64 |
| 6,021,469 | A * | 2/2000 | Tremblay et al. | 711/125 |
| 6,026,485 | A * | 2/2000 | O'Connor et al. | 712/226 |
| 6,076,155 | A * | 6/2000 | Blomgren et al. | 712/225 |
| 6,092,094 | A * | 7/2000 | Ireton | G06F 7/48 708/706 |
| 6,105,132 | A * | 8/2000 | Fritch et al. | 713/167 |
| 6,226,383 | B1 * | 5/2001 | Jablon | 380/30 |
| 6,247,143 | B1 * | 6/2001 | Williams | 714/11 |
| 6,332,215 | B1 * | 12/2001 | Patel et al. | 717/141 |
| 6,338,160 | B1 * | 1/2002 | Patel et al. | 717/139 |
| 6,374,266 | B1 * | 4/2002 | Shnelvar | |
| 6,421,790 | B1 * | 7/2002 | Fruehling et al. | 714/30 |
| 6,502,135 | B1 * | 12/2002 | Munger et al. | 709/229 |
| 6,618,761 | B2 * | 9/2003 | Munger et al. | 709/241 |
| 6,826,749 | B2 * | 11/2004 | Patel et al. | 717/148 |
| 6,834,310 | B2 * | 12/2004 | Munger et al. | 709/232 |
| 6,990,567 | B1 * | 1/2006 | Cohen et al. | 712/202 |
| 7,127,548 | B2 * | 10/2006 | Bennett et al. | 711/6 |
| 7,243,210 | B2 * | 7/2007 | Pedersen et al. | 711/220 |
| 7,310,348 | B2 * | 12/2007 | Trinh et al. | 370/428 |
| 7,349,403 | B2 * | 3/2008 | Lee et al. | 370/395.21 |
| 7,437,510 | B2 * | 10/2008 | Rosenbluth et al. | 711/118 |
| 7,478,224 | B2 * | 1/2009 | Strom et al. | 712/209 |
| 7,555,514 | B2 * | 6/2009 | Pedersen et al. | 708/670 |
| 7,620,941 | B1 * | 11/2009 | Leventhal | 717/128 |
| 7,644,322 | B2 * | 1/2010 | Dye | 714/50 |
| 7,917,732 | B2 * | 3/2011 | Strom | 712/209 |
| 7,996,659 | B2 * | 8/2011 | Renno et al. | 712/229 |
| 8,015,229 | B2 * | 9/2011 | Strom et al. | 708/523 |
| 2001/0019333 | A1 * | 9/2001 | Sasaki | A63F 13/57 345/653 |
| 2002/0041683 | A1 * | 4/2002 | Hopkins et al. | 380/28 |
| 2003/0152084 | A1 * | 8/2003 | Lee et al. | 370/395.21 |
| 2003/0191719 | A1 * | 10/2003 | Ginter | G06F 21/10 705/54 |
| 2004/0015678 | A1 * | 1/2004 | Strom | 712/202 |
| 2004/0107286 | A1 * | 6/2004 | Larson et al. | 709/229 |
| 2005/0039001 | A1 * | 2/2005 | Hudis | G06F 21/6218 713/166 |
| 2005/0071601 | A1 * | 3/2005 | Luick | 711/206 |
| 2005/0108498 | A1 * | 5/2005 | Kaminaga et al. | 711/209 |
| 2005/0114661 | A1 * | 5/2005 | Cheng | G06F 21/6218 713/167 |
| 2005/0149762 | A1 * | 7/2005 | Smith et al. | 713/202 |
| 2005/0240897 | A1 * | 10/2005 | Kailas | 717/100 |
| 2006/0116966 | A1 * | 6/2006 | Pedersen | G06F 21/10 705/59 |
| 2006/0174053 | A1 * | 8/2006 | Anderson et al. | 711/6 |
| 2006/0206687 | A1 * | 9/2006 | Vega | 711/206 |
| 2006/0236077 | A1 * | 10/2006 | Strom et al. | 712/209 |
| 2006/0242430 | A1 | 10/2006 | Marsh et al. | |
| 2006/0259734 | A1 * | 11/2006 | Sheu et al. | 711/203 |
| 2006/0271763 | A1 * | 11/2006 | Pedersen et al. | 711/220 |
| 2006/0277241 | A1 * | 12/2006 | Strom et al. | 708/523 |
| 2006/0277396 | A1 * | 12/2006 | Renno et al. | 712/228 |
| 2006/0282821 | A1 * | 12/2006 | Renno et al. | 717/114 |
| 2007/0006200 | A1 * | 1/2007 | Renno et al. | 717/162 |
| 2007/0079073 | A1 * | 4/2007 | Rosenbluth et al. | 711/134 |
| 2007/0168954 | A1 * | 7/2007 | Strom | 717/118 |
| 2007/0192396 | A1 * | 8/2007 | Pedersen et al. | 708/505 |
| 2008/0168529 | A1 * | 7/2008 | Anderson et al. | 726/1 |
| 2008/0189522 | A1 | 8/2008 | Meil et al. | |

FOREIGN PATENT DOCUMENTS

| | | |
|---|---|---|
| JP | 2004303242 A | 10/2004 |
| JP | 2005063223 A | 3/2005 |
| JP | 2005209068 A | 8/2005 |
| JP | 2007524148 A | 8/2007 |
| JP | 2008524726 A | 7/2008 |
| KR | 20050073178 A | 7/2005 |
| WO | WO 02/086699 A2 | 10/2002 |

OTHER PUBLICATIONS

Bell, D.E. et al., "Secure Computer System: Unified Exposition and Multics Interpretation", ESD-TR-75-306, Mar. 1976, the MITRE Corporation, Bedford, MA: HQ Electronic Systems Division, Hanscom AFB, MA, http://csrc.nist.gov/publications/history/bell76.pdf, 134 pages.

Biba, K.J., "Integrity Considerations for Secure Computer Systems", ESD-TR-76-732, Apr. 1977, The MITRE Corporation, Bedford, MA: HQ Electronic Systems Division, Hanscom AFB, MA, 68 pages.

Boebert, W.E., "On the Inability of an Unmodified Capability Machine to Enforce the *-Property", Proceedings of the 7th DoD/NBS Computer Security Conference, Sep. 24-26, 1984, Gaithersburg, MD: National Bureau of Standards, pp. 291-293.

Boebert, W.E. et al., "Secure ADA Target: Issues, System Design, and Verification", Proceedings of the 1985 Symposium on Security and Privacy, IEEE Computer Society, 1985, pp. 176-183.

Karger, Paul et al., "An Augmented Capability Architecture to Support Lattice Security and Traceability of Access", Proceedings of the 1984 Symposium on Security and Privacy, Apr. 29-May 2, 1984, Oakland, CA: IEEE Computer Society, pp. 2-12.

Karger, Paul A., "Improving Security and Performance for Capability Systems", Computer Laboratory Technical Report No. 149, Oct. 1988, University of Cambridge: Cambridge, England, http://domino.research.ibm.com/comm/research_people.nsf/pages/karger.pubs.html/$FILE/trthesis.pdf, 297 pages.

Lampson, Butler W., "Protection", Proc. Fifth Princeton Symposium on Information Sciences and Systems, Princeton University, Mar. 1971, pp. 437-443, reprinted in Operating Systems Review, 8.1, Jan. 1974, pp. 18-24.

Motobayashi, Shigeru et al., "The HITAC5020 Time Sharing System", Proceedings of the 24th ACM National Conference, ACM, 1969, pp. 419-429.

Neumann, P.G. et al., "A Provably Secure Operating System: The System, Its Applications, and Proofs", Computer Science Laboratory Report CSL-116, 7, May 1980, http://seclab.cs.ucdavis.edu/projects/history/papers/neum75.pdf, 327 pages.

Rajunas, S.A. et al., "Security in KeyKOS", Proceedings of the 1986 IEEE Symposium on Security and Privacy, IEEE Computer Society, 1986, pp. 78-85.

Schaufler, Casey, "The Simplified Mandatory Access Control Kernel", http://www.schaufler-ca.com/data/SmackWhitePaper20071102.pdf, 11 pages.

Schroeder, M.D. et al., "A Hardware Architecture for Implementing Protection Rings", Communications of the ACM, Mar. 1972, Abstract, 1 page.

Schroeder, M.D. et al., "Cooperation of Mutually Suspicious Subsystems in a Computer Utility", Ph.D Thesis, Dept. of Electrical Engineering, MAC TR-104, Sep. 1972, Massachusetts Institute of Technology: Cambridge, MA, http://www.lcs.mit.edu/publications/pubs/pdf/MIT-LCS-TR-104.pdf, 174 pages.

Wiseman, Simon, "A Secure Capability Computer System", Proceedings of the 1986 IEEE Symposium on Security and Privacy, IEEE Computer Society, Apr. 7-9, 1986, pp. 86-94.

Baker et al., "The Symbolics Ivory Processor: A 40 Bit Tagged Architecture Lisp Microprocessor", *Proceedings of the IEEE International Conference on Computer Design*, 1987, pp. 512-514.

* cited by examiner

| SUBJECT/OBJECT | 1 | ... | N |
|---|---|---|---|
| 1 | RWX, OL, TR | RX, OL, TR | RWX, OL, TR |
| ... | RX, OL, TR | RWX, OL, TR | W, OL, TR |
| N | RWX, OL, TR | W, OL, TR | RWX, OL, TR |

HARDWARE BASED MANDATORY ACCESS CONTROL

BACKGROUND OF THE INVENTION

1. Field of the Invention

The present application relates generally to an improved data processing apparatus and method and more specifically to mechanisms for providing hardware based mandatory access control.

2. Background of the Invention

One of the most significant issues in computer systems is security. Security systems are designed to protect the integrity, secrecy, and availability of the system and its data. These protections are typically provided by a combination of hardware methods, such as protected memory in which page tables define the allowed access for a processor context to a given page of memory, and software techniques in the operating system, such as a software based mandatory access control system. An example of one type of mandatory access control system is the Lampson's mandatory access control described in Lampson, B. W., "Protection," Proceedings of the Fifth Princeton Symposium on Information Sciences and Systems, Princeton University, March 1971, pp. 437-443, reprinted in Operating Systems Review, 8, 1, January 1974, pp. 18-24. Software mandatory access control systems often include mathematical models for secrecy protection, such as described in Bell and LaPadula, "Computer Security Model: Unified Expositions and Multics Interpretation," ESD-TR-75-306, March 1976, the MITRE Corporation, Bedford, Mass.: HQ Electronic Systems Division, Hanscom AFB, Mass. (available at http://csrc.nist.gov/publications/history/bell76.pdf), for example, and integrity protection, such as described in Biba, K. J., "Integrity Considerations for Secure Computer Systems," ESD-TR-76-732, April 1977, the MITRE Corporation, Bedford, Mass.: HQ Electronic Systems Division, Hanscom AFB, Mass., for example.

The existing hardware and software security systems have significant limitations. With typical hardware based protected memory, while access is controlled to the data when it is in memory, once the data is loaded into registers in the processor, access is no longer controlled by the hardware and instead, software mechanisms are employed to control access to these register values. Thus, security is dependent on the operating system software. If this software is not completely secure, i.e. there is some error in the operating system software that may be exploited, then the data stored in these registers may be exposed such that unauthorized processes or devices may access the data. A typical operating system may have millions of lines of code and thus, it is very difficult to ensure that all of this code is correct under all conditions. Thus, it is very probable that the operating system software, which controls access to the data in the processor registers, may provide security holes that may be exploited.

BRIEF SUMMARY OF THE INVENTION

In one illustrative embodiment, a method, in a data processing system, is provided for performing hardware based access control. The method comprises associating, in hardware of the data processing system, an instruction access policy label with an instruction to be processed by a processor of the data processing system. The method further comprises associating, in hardware of the data processing system, an operand access policy label with data in the data processing system. Moreover, the method comprises passing the instruction access policy label along with the instruction through one or more hardware functional units of the processor and passing the operand access policy label along with the data through the one or more hardware functional units of the processor. In addition, the method comprises utilizing one or more hardware implemented policy engines associated with the one or more hardware functional units of the processor to control access by the instruction to the data based on the instruction access policy label and the operand access policy label.

In another illustrative embodiment, a processor is provided that comprises one or more hardware functional units and one or more hardware implemented policy engines associated with the one or more hardware functional units. An instruction access policy label is associated, in hardware of the processor, with an instruction to be processed by the processor. An operand access policy label is associated, in hardware of the processor, with data processed by the processor. The instruction access policy label is passed along with the instruction through the one or more hardware functional units of the processor. The operand access policy label is passed along with the data through the one or more hardware functional units of the processor. The one or more hardware implemented policy engines operate to control access by the instruction to the data based on the instruction access policy label and the operand access policy label.

These and other features and advantages of the present invention will be described in, or will become apparent to those of ordinary skill in the art in view of, the following detailed description of the exemplary embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION OF THE INVENTION

Figure 1:
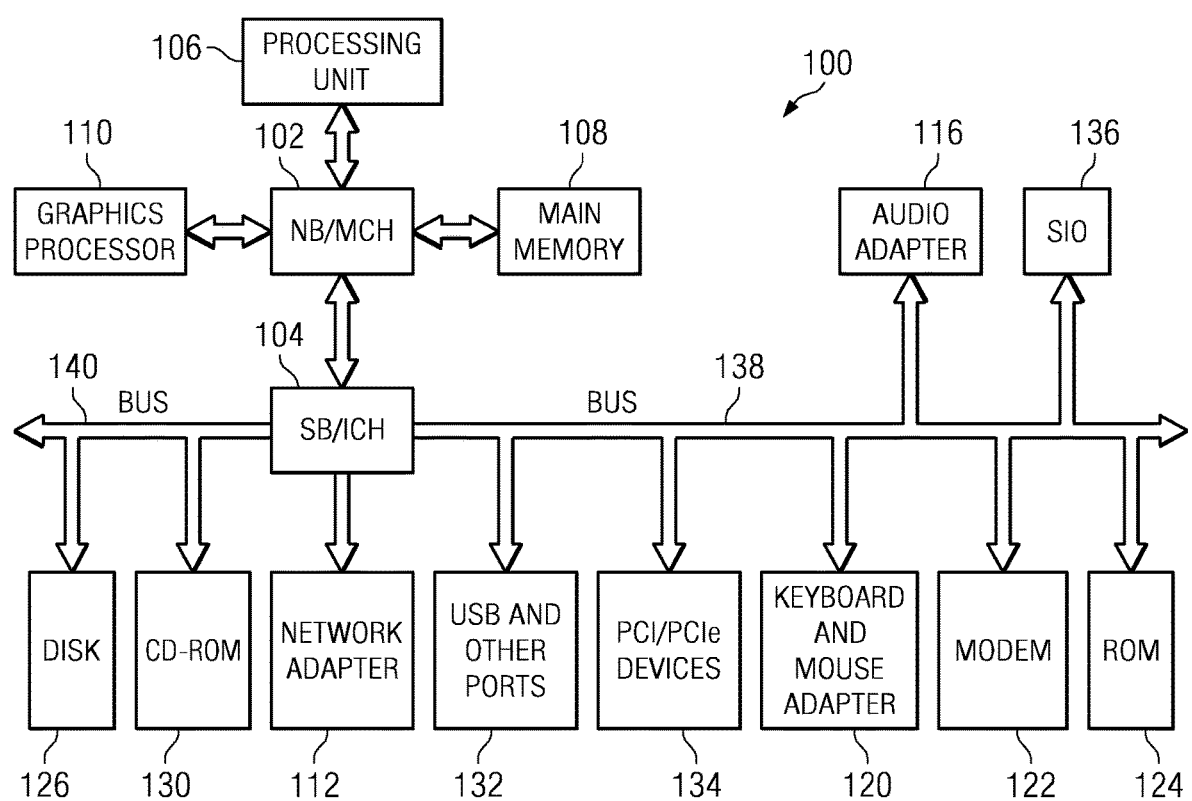
FIG. 1 is an exemplary block diagram of a data processing system in which exemplary aspects of the illustrative embodiments may be implemented.

The illustrative embodiments overcome the shortcomings associated with combined hardware and software mechanisms for controlling access to data values by implementing mandatory access control functions entirely within the hardware such that the security holes that may be present in software, such as the operating system, may be avoided. That is, by implementing these mandatory access controls in hardware, the data processing system is less dependent on the correctness of much of the software.

As will be appreciated by one skilled in the art, the present invention may be embodied as a system, method or computer program product. Accordingly, the present invention may take the form of an entirely hardware embodiment or an embodiment combining software (including firmware, resident software, micro-code, etc.) and hardware aspects that may all generally be referred to herein as a "circuit," "module" or "system." Furthermore, aspects of the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The illustrative embodiments are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The illustrative embodiments may be implemented in various types of data processing systems and devices. FIG. 1 is provided hereafter as an example of one type of data processing system in which the exemplary aspects of the illustrative embodiments may be implemented. It should be appreciated that FIG. 1 is only exemplary and is not intended to assert or imply any limitation with regard to the types or configurations of data processing systems or devices in which aspects of the illustrative embodiments may be implemented. Many modifications to the depicted data processing system may be made without departing from the spirit and scope of the present invention.

With reference now to the figures, FIG. 1 is an exemplary block diagram of an exemplary data processing system in which aspects of the illustrative embodiments may be implemented. In the depicted example, data processing system 100 employs a hub architecture including north bridge and memory controller hub (NB/MCH) 102 and south bridge and input/output (I/O) controller hub (SB/ICH) 104. Processing unit 106, main memory 108, and graphics processor 110 are connected to NB/MCH 102. Graphics processor 110 may be connected to NB/MCH 102 through an accelerated graphics port (AGP).

In the depicted example, local area network (LAN) adapter 112 connects to SB/ICH 104. Audio adapter 116, keyboard and mouse adapter 120, modem 122, read only memory (ROM) 124, hard disk drive (HDD) 126, CD-ROM drive 130, universal serial bus (USB) ports and other communication ports 132, and PCI/PCIe devices 134 connect to SB/ICH 104 through bus 138 and bus 140. PCI/PCIe devices may include, for example, Ethernet adapters, add-in cards, and PC cards for notebook computers. PCI uses a card bus controller, while PCIe does not. ROM 124 may be, for example, a flash basic input/output system (BIOS).

HDD 126 and CD-ROM drive 130 connect to SB/ICH 104 through bus 140. HDD 126 and CD-ROM drive 130 may use, for example, an integrated drive electronics (IDE) or serial advanced technology attachment (SATA) interface. Super I/O (SIO) device 136 may be connected to SB/ICH 104.

An operating system runs on processing unit 106. The operating system coordinates and provides control of various components within the data processing system 100 in FIG. 1. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 100 (Java is a trademark of Sun Microsystems, Inc. in the United States, other countries, or both).

As a server, data processing system 100 may be, for example, an IBM® eServer™ System p® computer system, running the Advanced Interactive Executive (AIX®) operating system or the LINUX® operating system (eServer, System p, and AIX are trademarks of International Business Machines Corporation in the United States, other countries, or both while LINUX is a trademark of Linus Torvalds in the United States, other countries, or both). Data processing system 100 may be a symmetric multiprocessor (SMP) system including a plurality of processors in processing unit 106. Alternatively, a single processor system may be employed.

Instructions for the operating system, the object-oriented programming system, and applications or programs are located on storage devices, such as HDD 126, and may be loaded into main memory 108 for execution by processing unit 106. The processes for illustrative embodiments of the present invention may be performed by processing unit 106 using computer usable program code, which may be located in a memory such as, for example, main memory 108, ROM 124, or in one or more peripheral devices 126 and 130, for example.

A bus system, such as bus 138 or bus 140 as shown in FIG. 1, may be comprised of one or more buses. Of course, the bus system may be implemented using any type of communication fabric or architecture that provides for a transfer of data between different components or devices attached to the fabric or architecture. A communication unit, such as modem 122 or network adapter 112 of FIG. 1, may include one or more devices used to transmit and receive data. A memory may be, for example, main memory 108, ROM 124, or a cache such as found in NB/MCH 102 in FIG. 1.

Those of ordinary skill in the art will appreciate that the hardware in FIG. 1 may vary depending on the implementation. Other internal hardware or peripheral devices, such as flash memory, equivalent non-volatile memory, or optical disk drives and the like, may be used in addition to or in place of the hardware depicted in FIG. 1. Also, the processes of the illustrative embodiments may be applied to a multiprocessor data processing system, other than the SMP system mentioned previously, without departing from the spirit and scope of the present invention.

Moreover, the data processing system 100 may take the form of any of a number of different data processing systems including client computing devices, server computing devices, a tablet computer, laptop computer, telephone or other communication device, a personal digital assistant (PDA), or the like. In some illustrative examples, data processing system 100 may be a portable computing device which is configured with flash memory to provide non-volatile memory for storing operating system files and/or user-generated data, for example. Essentially, data processing system 100 may be any known or later developed data processing system without architectural limitation.

The illustrative embodiments provide hardware implemented access control functions and a corresponding security architecture that is less dependent on the correctness of the software. With the mechanisms of the illustrative embodiments, a computer processing architecture, such as may be used in the system of FIG. 1, is modified to include an extended access control matrix mechanism. Moreover, all data within the computer processing architecture is labeled with a small integer label, e.g., a label of 8 bits for each 64 bit data word (although these sizes may vary for different processor types used in the computer processing architecture). Similarly, all processing contexts are labeled. The extended access control matrix is stored in memory and provides the access control policy for controlling access to the labeled data as it moves through the computer processing architecture.

For each instruction, and for each set of context and input operand labels, the extended access control matrix contains access control and transition rules. The access control rules imply the read, write and execute permissions. Entries in the extended access control matrix may further include an extended rule which specifies output operand labels as well as transition rules for the operation which may include instructions to trap or to alter the label of the context, such as in support of low watermark integrity protection models.

Figure 2:
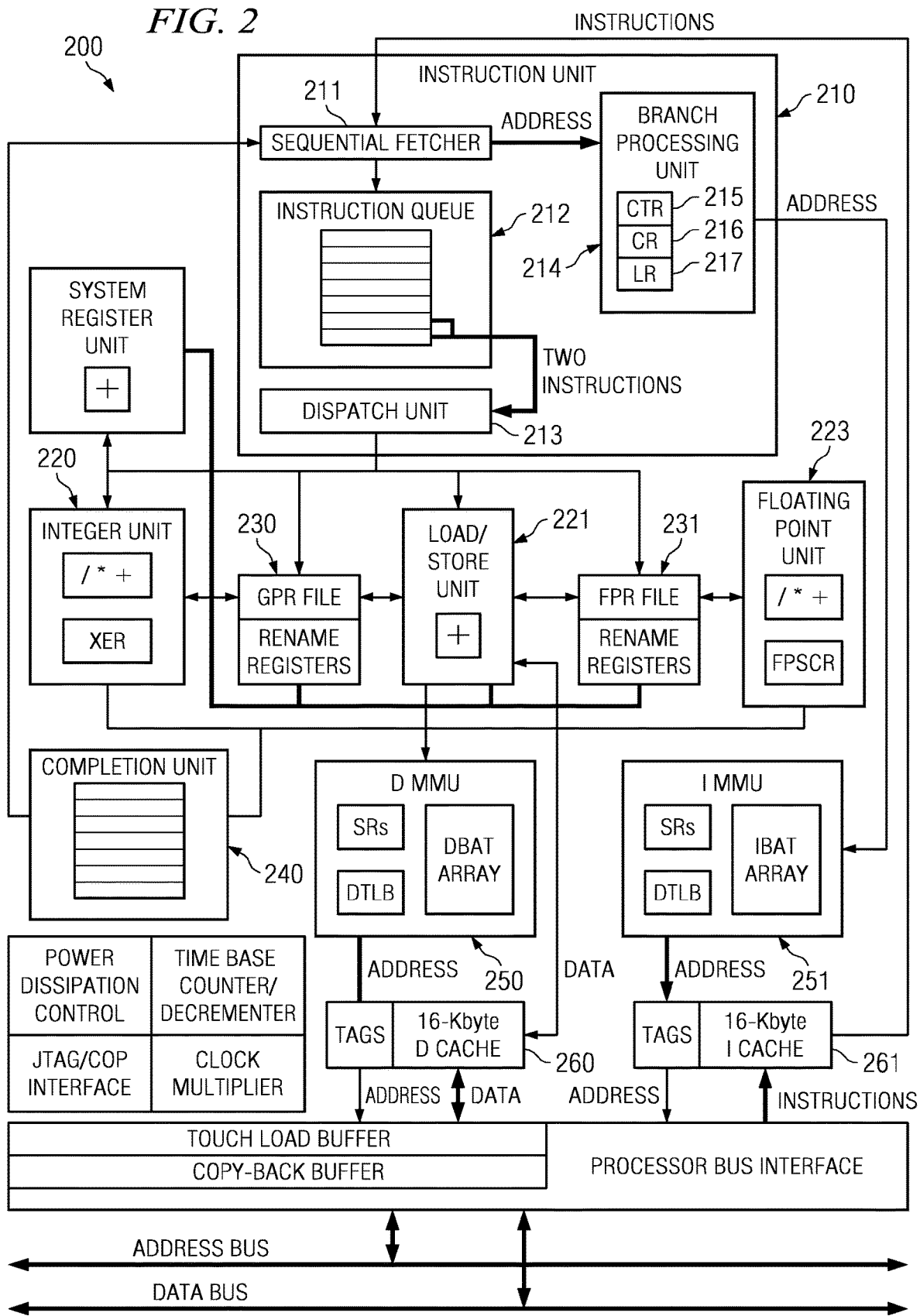
FIG. 2 is an exemplary diagram of a top level architecture diagram for a known processor.

To illustrate the modifications made by the illustrative embodiments to a computer processing architecture, it is best to first describe one known computer processing architecture. FIG. 2 is an exemplary diagram of a top level architecture diagram for a known processor, such as the Power PC 601 chip available from International Business Machines Corporation of Armonk, N.Y. As shown in FIG. 2, the known processor architecture 200 includes an instruction unit 210 which receives instructions, via the sequential fetcher 211, queues instructions in the instruction queue 212, and dispatches instructions via the dispatch unit 213. The instruction unit 210 further maintains registers 215-217 in branch processing unit 214 with counter and link address (CTR and LR) and condition information (CR).

The instructions are dispatched, by the dispatch unit 213, to the execution units 220-223 (integer, floating point, and load/store) as appropriate. Arguments and results of the instructions are stored in the general purpose registers (GPRs) of the GPR file 230 and floating point registers (FPRs) of the FPR file 231. The completion unit 240 provides instruction completion feedback to the instruction unit 210 which may cause branching and may modify the condition register 216. The load/store unit 221 and the instruction unit 210 retrieve and store data to main memory (not shown). The addresses for the interactions are translated from logical to physical addresses in the data memory management unit (DMMU) 250 and the instruction memory management unit (IMMU) 251. The data itself is cached in respective data and instruction caches 260-261.

Figure 3:
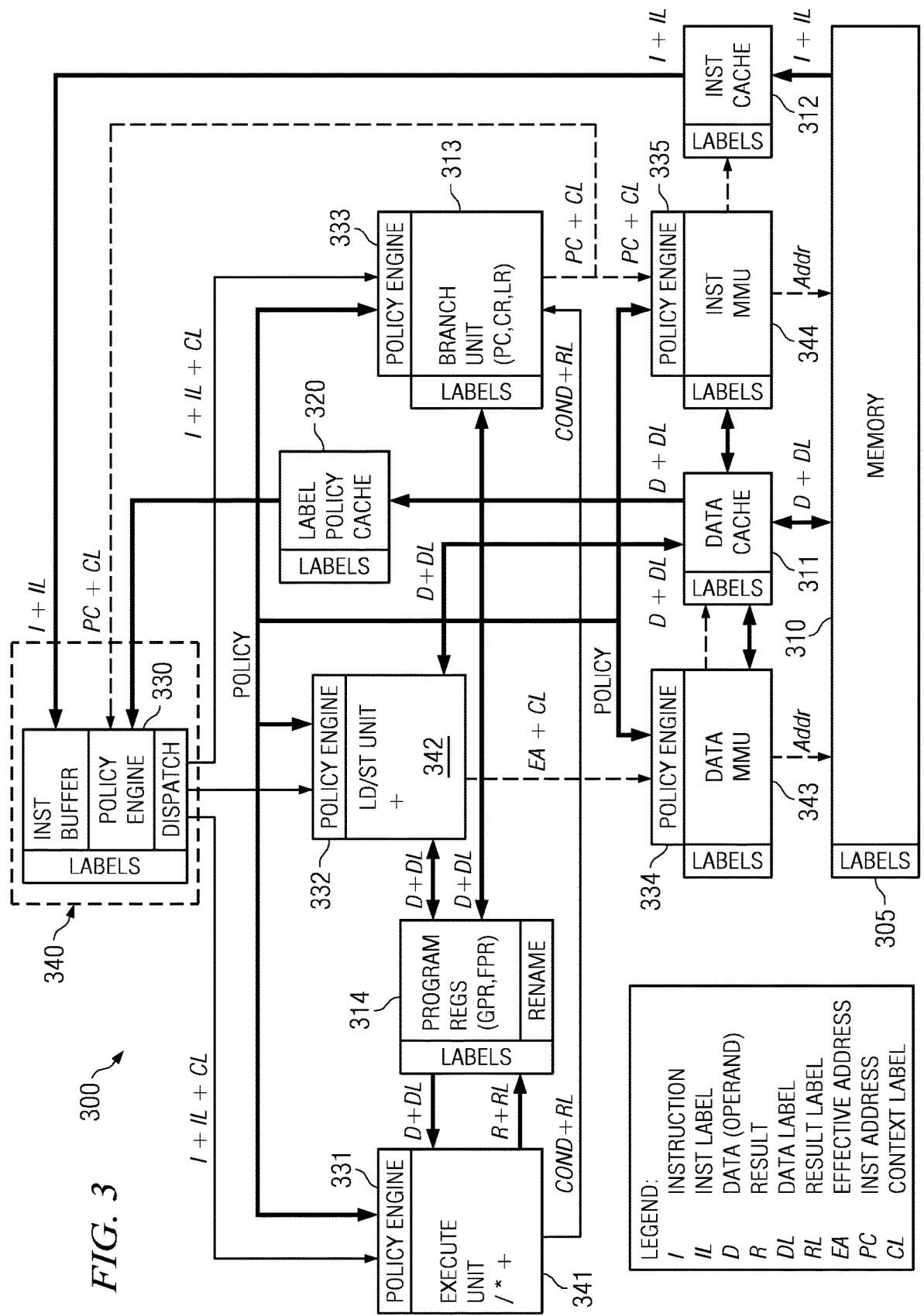
FIG. 3 is an exemplary diagram illustrating a modified computer processing architecture in accordance with one illustrative embodiment.

FIG. 3 is an exemplary diagram illustrating a modified computer processing architecture in accordance with one illustrative embodiment. As shown in FIG. 3, the memory system 310 of the computer processing architecture 300 is modified to provide labels 305 for all data words, e.g., 8 bit labels for each 64 bit data word. These labels are carried with the data at all times, such as when loaded into the caches, e.g., data cache 311 and instruction cache 312, or processor registers, such as PC register, CR register, and LR register in branch unit 313 or GPRs/FPRs in program registers 314, for example. The computer processor architecture 300 is modified to include the use of an extended access control matrix, which may be wholly or partially stored in the label policy cache 320. Moreover, the extended access control matrix may be wholly or partially stored in the memory 310.

Figures 4, 5:
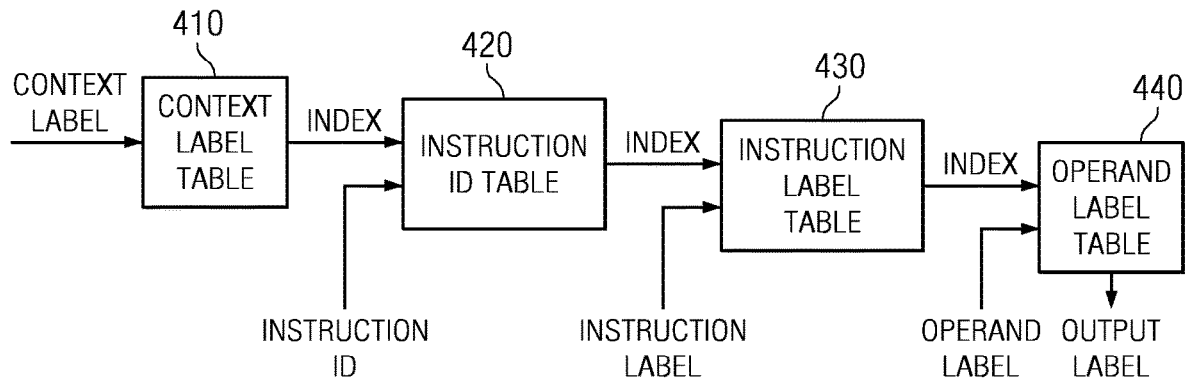
FIG. 4 is an exemplary diagram illustrating an example for loading a register with an intermediate value using a label policy lookup operation in accordance with one illustrative embodiment.
FIG. 5 is an exemplary diagram of a policy table in accordance with one illustrative embodiment.

The extended access control matrix, an example of which is shown in FIG. 5 hereafter, is comprised of one or more tables. There is a similar table for each instruction type, as specified by an instruction ID as discussed hereafter, in the extended access control matrix. The table specifies, based on the input label or labels of the data and instruction, and the processor context label of the process associated with the instruction, the access rights and transition rules which govern the execution of the instruction. The rules include additional operations, including the ability to trap the instruction or to modify, i.e. transition, the context label as a result of the instruction, that are to be performed when executing the instruction. This policy is enforced by the label policy engines 330-335 provided in association with the instruction unit 340, execute unit 341, load/store unit 342, data MMU 343, and instruction MMU 344. These label policy engines 330-335 receive the label on the instruction, i.e. the "instruction label" (IL) from the instruction decode unit of the instruction unit 340, the label on the current context ("PC"), i.e. the "context label" (CL), from the instruction unit 340, and labels on the operands from the respective data registers, i.e. "data label" (DL). The result of the policy lookup may include a new label for the output result in the register, a new label for the context (PC) in the instruction unit 340, or a signal to the instruction unit 340 to trap the existing instruction.

To further explain the "trapping" of an existing instruction, consider that a cross domain call is when a software interrupt is made to a more privileged level of software, such as when an application makes a system call to the operating system kernel. A trap is an involuntary cross domain call. There are existing traps for illegal instructions, such as divide by zero, or dereferencing a null pointer, so that the more privileged software can determine what to do, such as kill the application that attempted to make the illegal instruction. In the illustrative embodiments, if the extended access control matrix indicates to trap the instruction, it is because the instruction is illegal for the existing mandatory access control policy and labels, and the next level (kernel or hypervisor) needs to determine what to do, i.e. the instruction is trapped so that the kernel/hypervisor can take appropriate action, such as to kill the process, change the label on the process, etc.

In addition to the labels on data in memory flowing into both the instruction unit 340 and into the registers of the branch unit 313 and program registers 314, the data in the label policy cache 320, and in the instruction and data MMUs 343-344 are also labeled. Also, the logical addresses sent to the data and instruction MMUs 343-344 carry the label of the current process context. The MMUs 343-344 are extended to include allowable context labels in the respective translation/access tables, so that a context cannot even attempt to address memory whose page is not properly labeled. The translation/access tables are part of the MMUs 343-344 with the content of these translation/access tables providing the data for the traditional translation of addresses from logical to physical addresses performed by the MMU 343-344. With regard to the improvements made by the illustrative embodiments, the translation/access table data is labeled to control who can load/change the data in the translation/access tables, i.e. the labels on the MMU translation/access table data are there to control read/write access to the translation/access tables so that the hardware can control who can load or access the translation/access tables.

Thus, for example, if the instruction MMU 344 receives a program counter (PC) and a context label (CL) (where PC+CL is the process context), which are generated in the branch unit 313 and sent to the instruction MMU 344 for fetching the next instruction and to the instruction processor 340 for execution control as the result of branches, and the context label (CL) does not match an allowable context label for accessing the corresponding page in memory as determined by the instruction MMU's 344 translation/access table entries, then the process context will not be able to access the memory page since a corresponding valid address (Addr) will not be output by the instruction MMU 344 for accessing an instruction in memory 310. Similarly, if the context label (CL) provided to the data MMU 345 does not match a CL for the memory page storing the data corresponding to the effective address (EA), then the data MMU 345 will not output a valid address (Addr) for retrieving the data from memory 310.

As shown in FIG. 3, the instruction cache 312 receives an instruction (I) and instruction label (IL) from memory 310. In turn, the instruction cache 312 outputs an instruction (I) and its corresponding instruction label (IL) to the instruction buffer of the instruction unit 340. A policy engine 330 of the instruction unit 340 receives label policy information from the label policy cache 320 for the instruction type of the received instruction (I). A dispatcher of the instruction unit 340 sends the instruction (I), the instruction's label (IL), and the context label (CL) for the processor context to one or more of the execution unit 341 and the branch unit 313. In addition, the policy information obtained from the label policy cache 320 is provided to the policy engines 331-335.

The execution unit 341 and/or branch unit 313 receives data (D) and corresponding data label (DL) information from the program registers 314 for data required by the execution unit 341 or branch unit 313. Moreover, if the data needs to be loaded or stored, the data (D) and data label (DL) may be loaded or stored from/to data cache 311 via the load/store unit 342. The execution unit 341 may provide a result (R) of the execution and a result label (RL) to the program registers 314. Moreover, the load/store unit 342 may generate an effective address (EA) based on the results (R) and provide that effective address (EA) to the data MMU 345 along with the context label (CL) in order to load/store data from/to memory 310 and/or data cache 311. The execution unit 341 may further provide a condition result output (Cond) and the result label (RL) to the branch unit 313.

FIG. 4 is an exemplary diagram illustrating an example for loading a register with an intermediate value using a label policy lookup operation in accordance with one illustrative embodiment. The lookup operation may be performed, for example, by the policy engines of the processor. Moreover, while four separate tables are shown in FIG. 4 for purposes of description, it should be appreciated that one or more three-dimensional tables, or tables having greater than three-dimensions, may be used instead of the multiple two-dimensional tables. FIG. 4 is intended to show the overall effect of having a multi-dimensional lookup table with four inputs and one label output. For optimization, the illustrative embodiments show this implemented as four smaller tables where the first three tables output indexes for where to start in the next table. Only the last table, e.g., table 440, has the actual output labels in this simplified example. It should be appreciated that this is only an example and is not intended to state or imply any limitation with regard to how a multi-dimensional lookup table may be implemented with the mechanisms of the illustrative embodiments.

As shown in FIG. 4, the policy lookup operation typically involves performing a lookup of the context label (CL) in a context label table 410. The output of the context label table 410 lookup operation is an index into the instruction ID table 420. The index into the instruction ID table 420 is used along with an instruction ID for the instruction to perform a lookup operation in the instruction ID table 420 with the result being an output of an index into the instruction label table 430. It should be noted that the actual instruction data, in one illustrative embodiment, is a 32 bit value fetched from memory, with the additional 8 bit instruction label. The 32 bit instruction contains an initial "ID" part, which indicates the basic instruction, such as "add," and the remaining bits are instruction specific operands, such as the source and destination registers to add. By virtue of using the instruction ID and the operand labels hereafter, essentially the policy lookup tables 410-440 are able to be varied by the basic instruction ID and the labels of the operands.

The index into the instruction label table 430 along with the instruction label (IL) for the instruction (I) are used to perform a lookup operation in the instruction label table 430. The result of the lookup operation in the instruction label table 430 is an index into the operand label table 440. The index into the operand label table 440 along with the operand label, which is the data label (DL) for respective lines associated with registers 314 or memory 310 depending upon where the operands are present, are used to perform a lookup operation in the operand label table 440 with the result being an output label to be used to label the output of the instruction of a flag to a trap. For example, for arithmetic instructions, the output label is the result label (RL) of output line R+RL in FIG. 3. For load/store instructions, the results are the D+DL lines going from memory to registers. For some instructions, the operands and results are already in the registers.

To understand the label policy lookup operation of FIG. 4 more clearly, consider the following simple example of an instruction to load a register with an immediate value. Using the Intel 486 instruction nomenclature, this can be represented as:

MOV EAX, 0
(load the 32 bit register EAX with the immediate 32 bit value 0).

There are three labels associated with this instruction: the label on the process context, e.g., the context label (CL), attempting to execute the instruction, the instruction label (IL) on the instruction itself (MOV EAX), and the operand label on the immediate value, e.g., the label on the 32 bit operand data word (0). Also, there is the instruction ID (MOV). In a general case, there may also be a label on the existing data in the EAX register which is to be overwritten, and the policy could depend on this label also, but for simplicity in this example, and in typical practice, it is assumed that a process can always overwrite its register values regardless of label. The policy table(s) resides in memory 310 and/or in the label policy cache 320, and is accessed based on these labels and the instruction ID as discussed above. The output value will be either the new label to be assigned to the value moved into EAX or a reserved label indicating a trap should occur.

There may be instructions, such as NOP (no operation), in which only the label of the process and of the instruction are used and, in more complex instructions, there may be many operands resulting in many different operand labels and operand lookup operations in one or more operand label table(s). Addressing in the Intel 486, for example, may include values from a segment register, base register, index register, scale value, and displacement, all of which will have operand labels. Thus, the policy table(s) will vary in dimension based on the exact instruction and addressing mode involved.

One skilled in the art will recognize that the processor may cache all or part of these tables, such as in the label policy cache 320, for performance reasons. Similarly, in the typical case, all of the labels are likely to be identical, and the implementation may handle this case directly (without policy lookup) for speed. That is, in typical cases, all of the instructions and data associated with a running process will all have the same label. For example, a process and its data may all be labeled as "Top Secret." While this process is running, the instruction and data labels will all be "Top Secret," unless the program makes a cross domain call, such as a system call to the kernel context. As long as the process is simply executing its code with its data, and not making a cross domain call, the labels will remain the same, and the labels on all instruction output will remain "Top Secret."

In addition, the policy may allow calculations on the relevant labels, including minimum, or maximum function calculations, to reduce the size of the tables for simple (hierarchical) policies. Additional hardware components may be added for performance, such as a mechanism for rapidly relabeling pages in memory, without having to have the processor do this directly one word at a time. In addition, the illustrative embodiments may be applied to any processor, not just the Intel 486, used in the above example.

FIG. 5 is an exemplary diagram of a policy table in accordance with one illustrative embodiment. The example shown in FIG. 5 is only one two-dimensional policy table and it should be recognized that a plurality of these types of tables may be used by the policy engines, such as in the manner shown in FIG. 4, in order to perform a policy lookup operation. The policy table shown in FIG. 5 is a simplified table that determines a policy based on only two indices, such as a context label and an instruction label, for example. In an actual implementation of the policy table, the policy table 500 may be a multi-dimensional table or set of tables such that for each instruction ID, and each set of context and input operand labels, the policy table contains access control and transition rules. The access control rules imply the read, write, and execute permissions, along with an extended rule which specifies output operand labels, as well as transition rules for the operation, which may include instructions to trap or to alter the label of the context.

That is, as discussed above, a trap is a cross domain call to a more privileged part of software, which handles the case of the instruction being denied permission to continue. Related to traps, is another option in which the instruction is allowed to execute, but only after the current context label (CL) is changed to that indicated by the transition rule. For example, one policy may simply deny a "Unclassified" process from reading "Top secret" data, in which case the lookup would result in the output "Trap" label, stopping the process and invoking the privileged trap handler, which would terminate the process. An alternative is for the policy lookup to result in a "transition" rule to change (or promote) the process context label (CL) to "Top Secret," and then allow the instruction to continue. The mechanism is general, and any of these behaviors can be controlled by loading the proper data into the policy lookup tables.

As shown in FIG. 5, the policy table is comprised of a plurality of entries indexed by a subject index and an object index. The subject index, for example, may be used to index into a particular row of the table while the object index may be used to index into a particular column of the table, or vice versa. As an example, a subject index may be the context label for the process submitting the instruction while the object index may be an instruction label associated with the instruction.

Each entry in the policy table 500 includes the access control rules for defining the permissions that an instruction having the corresponding instruction label may perform, e.g., read (R), write (W), execute permissions (X), and the like. In addition, each entry in the policy table 500 further includes an extended rule specifying output operand labels (OLs) and transition rules (TR) for the operation. Thus, by performing a lookup in the policy table 500, the policy engines may determine what permissions the particular instruction from the particular context has, the labels to apply to the operands output by the instruction, and the transition rules for the instruction.

Once the output label, trap label, or transition label is found in the policy table 500 via the policy table lookup operation, the output is given to the respective instruction unit (arithmetic (±/*), load/store (LD/ST), Branch, etc.) which is to execute the instruction. If the output is a label, the instruction unit applies the label to any and all output data. For example, for a MOV instruction, the new copy of the data in the destination register or memory would have the output label applied. If the output label indicates a trap, then the Branch Unit redirects the execution to the trap handler address. If the output is a transition label, the new label is set on the current process's context, i.e. context label (CL).

Figure 6:
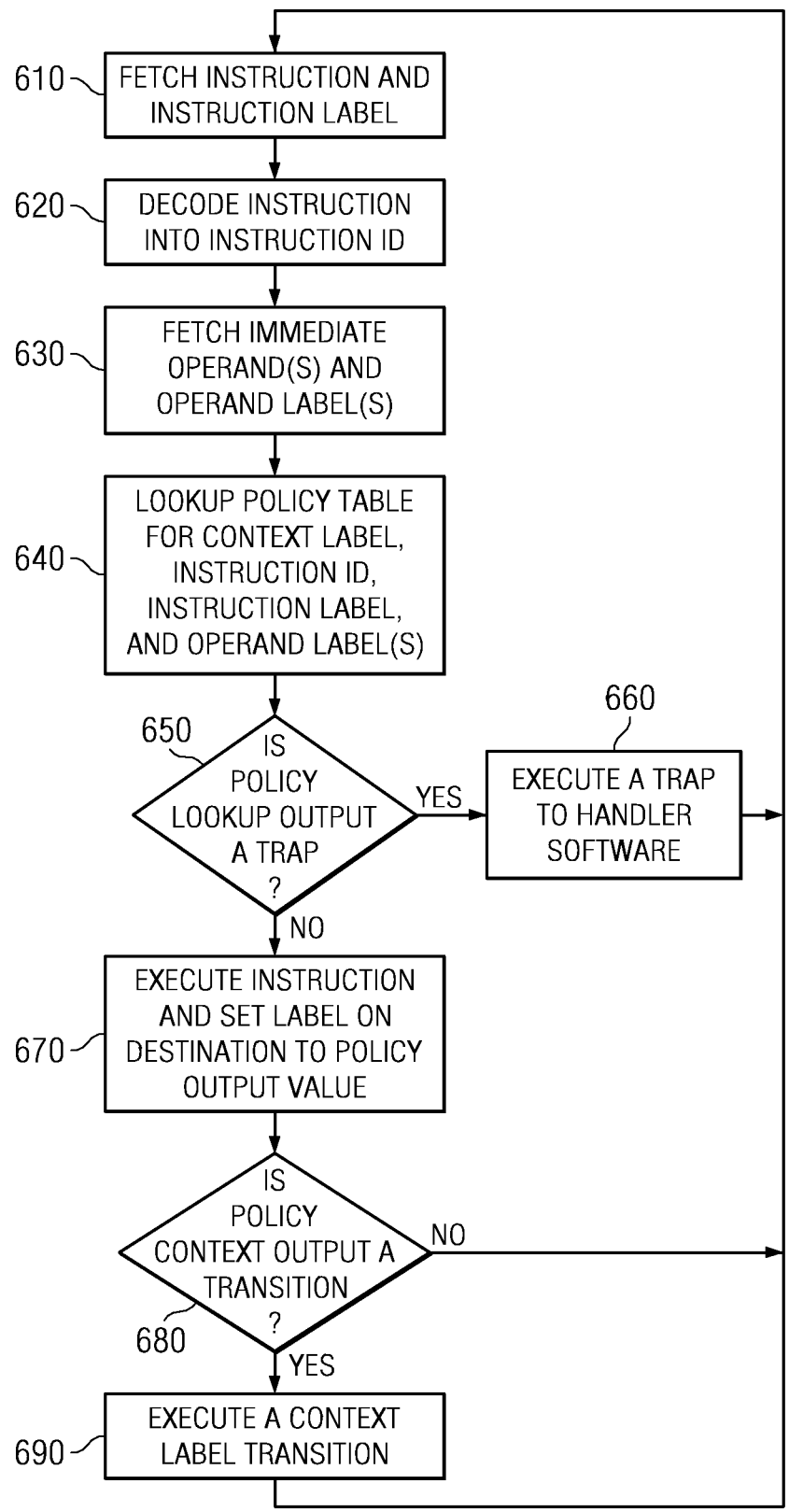
FIG. 6 is a flowchart outlining an exemplary operation for performing a policy lookup in accordance with one illustrative embodiment.

FIG. 6 is a flowchart outlining an exemplary operation for performing a policy lookup in accordance with one illustrative embodiment. As shown in FIG. 6, the operation starts with the next instruction, as pointed to by the program counter (PC), being fetched along with its corresponding instruction label (step 610). The instruction is decoded into an instruction ID and possible arguments (step 620). In the example of "MOV EAX, 0" above, the instruction word includes the instruction ID "MOV," the destination register (EAX), and the source (the next immediate word, (0).

Having decoded the instruction, the operand(s) and destination of the instruction are known and the operand(s) and operand label(s) are fetched (step 630). The policy output label is determined by a policy table lookup operation as described above with regard to FIGS. 4 and 5, for example (step 640). For example, the context label (CL), instruction ID (MOV), instruction label, and operand label (0) are all known and can be used to perform the multi-dimensional table lookup operation in the manner previously described. The instruction ID may be used to identify a particular subset of the policy tables with the context label, instruction label, and operand label providing indexes into respective ones of the tables to generate pointers to the other tables and, subsequently, an output label.

The output label obtained from the policy table(s) via the policy table lookup operation is tested to determine if it is a trap label (step 650). If the output label is a trap label, a trap is executed, for example, by executing a software interrupt to transfer control to a more privileged software handler (step 660). If the output label is not a trap label, then the instruction is executed and the label associated with the result data generated by the execution of the instruction is set to the output label value at the destination register(s) that store the result data (step 670). For example, the immediate 0 value is copied into register EAX in the MOV instruction example above and the label on register EAX is set to the output label.

The context output label is tested to determine if the output label indicates a context transition (step 680). If so, the context label (CL) is also set to the output label value (step 690). Thereafter, or if the output label does not indicate a context transition, the program counter (PC) is set to the next instruction location and the operation returns to step 610.

Thus, the illustrative embodiments provide hardware mechanisms for performing access control. These hardware mechanisms avoid the possible security holes that may be present in traditional software based access control mechanisms. Thus, a more secure system is provided by implementing the access control completely within the hardware rather than relying on software once data/instructions are loaded into registers.

As noted above, it should be appreciated that the illustrative embodiments may take the form of an entirely hardware embodiment, an entirely software embodiment or an embodiment containing both hardware and software elements. In one exemplary embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system comprising a processor, for performing hardware based access control, comprising:
    associating, in hardware of the data processing system, an instruction access policy label with an instruction;
    associating, in hardware of the data processing system, an operand access policy label with data in the data processing system;
    executing, by hardware of the processor, the instruction;
    passing, by one or more hardware functional units of the processor, the instruction access policy label along with the instruction through the one or more hardware functional units of the processor;
    passing, by the one or more hardware functional units of the processor, the operand access policy label along with the data through the one or more hardware functional units of the processor; and
    controlling, by one or more hardware implemented policy engines associated with the one or more hardware functional units of the processor, access by the instruction to the data, during the execution of the instruction by the hardware of the processor, based on the instruction access policy label and the operand access policy label, wherein controlling access by the instruction to the data comprises applying, to the execution of the instruction, access permissions that govern the execution of the instruction on the data based on the instruction access policy label and the operand access policy label.

2. The method of claim 1, wherein the one or more hardware functional units comprises an execute unit, a load/store unit, and a branch unit, and wherein each of the execute unit, the load/store unit, and the branch unit has a corresponding hardware implemented policy engine that performs the controlling access operation for their respective corresponding execute unit, load/store unit, or branch unit when processing the instruction.

3. The method of claim 1, further comprising storing, in a hardware implemented access policy label cache of the data processing system, an extended access control matrix specifying access controls for a plurality of access policy labels, wherein controlling access by the instruction to the data based on the instruction access policy label and the operand access policy label comprises controlling the access based on the extended access control matrix.

4. The method of claim 3, wherein the extended access control matrix comprises one or more lookup tables for each instruction type, the instruction type being decoded by the processor from the instruction as an instruction identifier, and wherein controlling the access based on the extended access control matrix comprises accessing a lookup table corresponding to an instruction type of the instruction passed through the one or more hardware functional units.

5. The method of claim 4, wherein each of the lookup tables specifies, based on an input operand label for data, an input instruction label for an instruction, and a context label for a process associated with the instruction, the access rights and transition rules which govern execution of the instruction, and wherein controlling the access based on the extended access control matrix comprises controlling the access based on the access rights and transition rules associated with a combination of an input operand label for the data passing through the one or more hardware functional units and an input instruction label and context label for the instruction passing through the one or more hardware functional units.

6. The method of claim 5, wherein the transition rules specify additional operations that are performed when executing the instruction, and wherein controlling the access based on the access rights and transition rules comprises executing the additional operations specified in the transition rules associated with the combination, when executing the instruction.

7. The method of claim 6, wherein the additional operations executed when executing the instruction comprise at least one of a trap operation that traps the instruction and causes a software trap handler to execute on the instruction or a transition operation that transitions the context label from a current value to a context label value associated with an output of a policy label lookup operation in the extended access control matrix.

8. The method of claim 3, further comprising:
    accessing, by the one or more hardware implemented policy engines, the extended access control matrix stored in the hardware implemented access policy label cache; and
    enforcing an access control policy that controls access to data by instructions processed by the data processing system based on the extended access control matrix.

9. The method of claim 3, wherein passing the instruction access policy label comprises:
    receiving the instruction and the instruction access policy label in a first hardware implemented policy engine associated with a first hardware functional unit of the processor; and
    receiving, in the first hardware implemented policy engine, a current process context label associated with the instruction, and wherein passing the operand access policy label comprises receiving, in the first hardware implemented policy engine, one or more operand labels corresponding to one or more operands of the instruction, and wherein the one or more hardware implemented policy engines control access by the instruction to the data based on the instruction access policy label and the operand access policy label at least by performing a policy lookup operation on the extended access control matrix based on the instruction label, current process context label, and the one or more operand labels to identify an output label for a result of the execution of the instruction.

10. The method of claim 9, wherein, controlling, by the one or more hardware implemented policy engines, access by the instruction to the data based on the instruction access policy label and the operand access policy label further comprises:
    determining whether the output label is a trap label or not a trap label;

executing a trap by executing a software interrupt to transfer control to a privileged software handler in response to a determination that the output label is a trap label; and executing the instruction and setting a label associated with result data of the execution of the instruction to the output label, in response to the output label being determined to not be a trap label.

11. The method of claim 10, wherein, controlling, by the one or more hardware implemented policy engines, access by the instruction to the data based on the instruction access policy label and the operand access policy label further comprises:

determining that the output label indicates a context transition; and setting the current process context label to the output label value in response to the output label indicating a context transition.

12. A processor, comprising:

one or more hardware functional units; and one or more hardware implemented policy engines associated with the one or more hardware functional units, wherein:

hardware of the processor associates an instruction access policy label with an instruction, associates an operand access policy label with data processed by the processor, and executes the instruction, the one or more hardware functional units pass the instruction access policy label, along with the instruction, through the one or more hardware functional units of the processor, and pass the operand access policy label along with the data through the one or more hardware functional units of the processor, and the one or more hardware implemented policy engines control access by the instruction to the data, during execution of the instruction by the hardware of the processor, based on the instruction access policy label and the operand access policy label, wherein the one or more hardware implemented policy engines control access by the instruction to the data at least by applying, to the execution of the instruction, access permissions that govern the execution of the instruction on the data based on the instruction access policy label and the operand access policy label.

13. The processor of claim 12, wherein the one or more hardware functional units comprises an execute unit, a load/store unit, and a branch unit, and wherein each of the execute unit, the load/store unit, and the branch unit has a corresponding hardware implemented policy engine.

14. The processor of claim 12, wherein the processor comprises a hardware implemented access policy label cache that stores an extended access control matrix specifying access controls for a plurality of access policy labels, wherein the one or more hardware implemented policy engines control access by the instruction to the data based on the instruction access policy label and the operand access policy label at least by controlling the access based on the extended access control matrix.

15. The processor of claim 14, wherein the extended access control matrix comprises one or more lookup tables for each instruction type, the instruction type being decoded by the processor from the instruction as an instruction identifier, and wherein the one or more hardware implemented policy engines control the access based on the extended access control matrix at least by accessing a lookup table corresponding to an instruction type of the instruction passed through the one or more hardware functional units.

16. The processor of claim 15, wherein each of the lookup tables specifies, based on an input operand label for data, an input instruction label for an instruction, and a context label for a process associated with the instruction, the access rights and transition rules which govern execution of the instruction, and wherein the one or more hardware implemented policy engines control the access based on the extended access control matrix at least by controlling the access based on the access rights and transition rules associated with a combination of an input operand label for the data passing through the one or more hardware functional units, and an input instruction label and context label for the instruction passing through the one or more hardware functional units.

17. The processor of claim 16, wherein the transition rules specify additional operations that are performed when executing the instruction, and wherein controlling the access based on the access rights and transition rules comprises performing the additional operations specified in the transition rules associated with the combination, when executing the instruction.

18. The processor of claim 17, wherein the additional operations performed when executing the instruction comprise at least one of a trap operation that traps the instruction and causes a software trap handler to execute on the instruction or a transition operation that transitions the context label from a current value to a context label value associated with an output of a policy label lookup operation in the extended access control matrix.

19. The processor of claim 14, wherein the one or more hardware implemented policy engines access the extended access control matrix stored in the hardware implemented access policy label cache and enforce an access control policy that controls access to data by instructions processed by the processor.

20. The processor of claim 14, wherein passing the instruction access policy label through the one or more hardware functional units comprises:

receiving the instruction and the instruction access policy label in a first hardware implemented policy engine associated with a first hardware functional unit of the processor; and receiving, in the first hardware implemented policy engine, a current process context label associated with the instruction, and wherein passing the operand access policy label comprises receiving, in the first hardware implemented policy engine, one or more operand labels corresponding to one or more operands of the instruction, and wherein the one or more hardware implemented policy engines control access by the instruction to the data based on the instruction access policy label and the operand access policy label at least by performing a policy lookup operation on the extended access control matrix based on the instruction label, current process context label, and the one or more operand labels to identify an output label for a result of the execution of the instruction.

21. The processor of claim 20, wherein the one or more hardware implemented policy engines control access by the instruction to the data based on the instruction access policy label and the operand access policy label at least by:

determining whether the output label is a trap label or not a trap label;

executing a trap by executing a software interrupt to transfer control to a privileged software handler in response to a determination that the output label is a trap label; and executing the instruction and setting a label associated with result data of the execution of the instruction to the output label, in response to the output label being determined to not be a trap label.

22. The processor of claim 21, wherein the one or more hardware implemented policy engines control access by the instruction to the data based on the instruction access policy label and the operand access policy label at least by:

determining that the output label indicates a context transition; and setting the current process context label to the output label value in response to the output label indicating a context transition.

* * * * *